April 10, 1934.  L. E. LA BRIE  1,954,530
BRAKE
Filed March 25, 1929
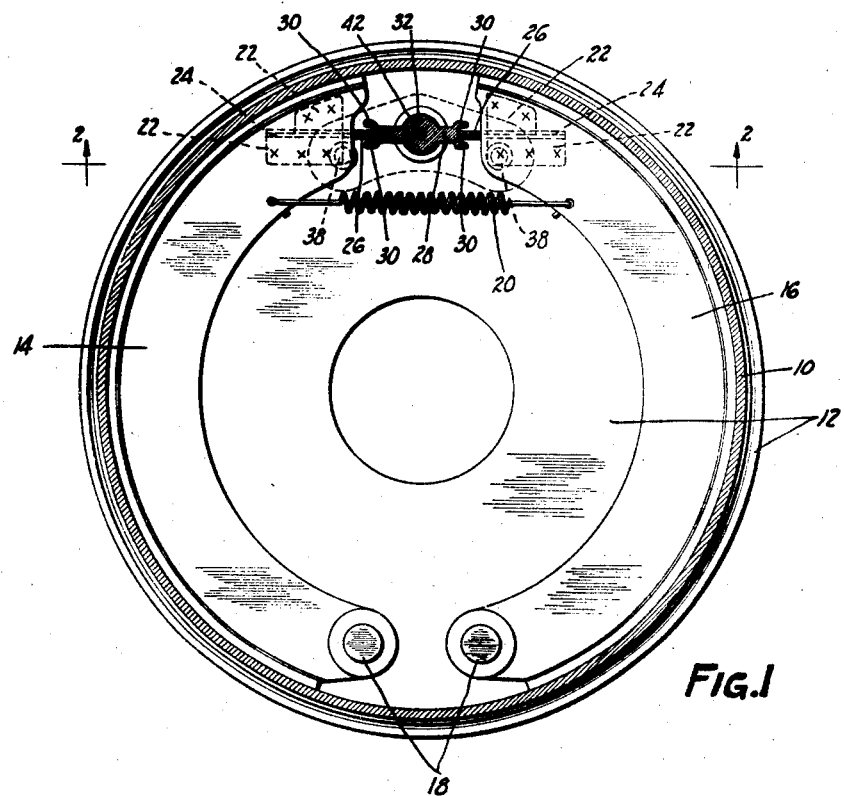
FIG.1
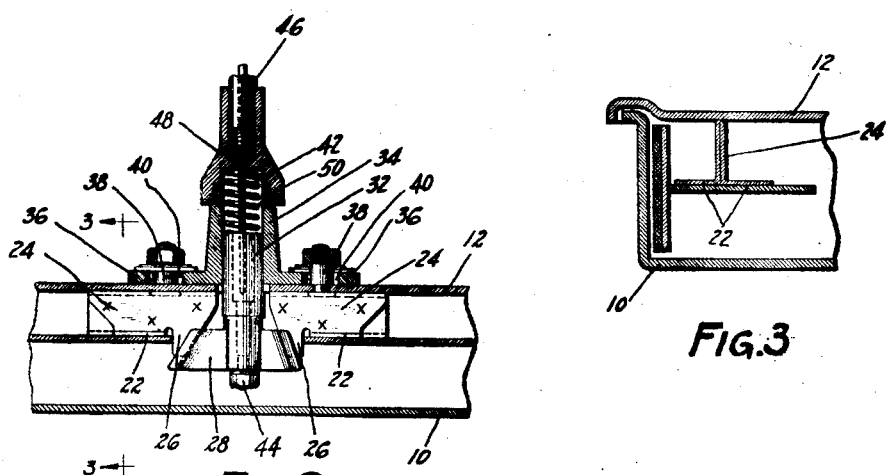
FIG.2
FIG.3
INVENTOR.
LUDGER E. LA BRIE
BY
ATTORNEY Patented Apr. 10, 1934

1,954,530

UNITED STATES PATENT OFFICE

1,954,530
BRAKE

Ludger E. La Brie, South Bend, Ind., assignor to Bendix Brake Company, South Bend, Ind., a corporation of Illinois Application March 25, 1929, Serial No. 349,598

13 Claims. (Cl. 188—78)

This invention relates to brakes, and is illustrated as embodied in an internal expanding automobile brake. An object of the invention is to simplify the construction and arrangement of the parts, more especially when they are mounted on a swiveled front wheel, by utilizing as an applying device a wedge or the like movable perpendicularly toward the backing plate. Various features of novelty relate to the construction of the shoes or the equivalent friction means with novel end fittings engaging the above-described applying device, and preferably provided with portions slidably engaging the backing plate and taking the lateral component of the applying force, to the structure of these novel end fittings and of the wedge, to the construction and arrangement of the means for operating the wedge, and to various novel and desirable details which will be apparent from the following description of the illustrative embodiment shown in the accompanying drawing, in which:

Figure 1 is a vertical section through the brake, just inside the head of the brake drum, and showing the brake shoes in side elevation;

Figure 2 is a partial section substantially on the line 2—2 of Figure 1, and showing the applying means; and Figure 3 is a partial section on the line 3—3 of Figure 2, showing the construction and mounting of one of the end fittings.

The illustrated brake includes a rotatable drum 10, at the open side of which is a suitable support such as a backing plate 12, and within which is arranged the friction means of the brake which, in this particular embodiment, includes a pair of interchangeable shoes 14 and 16 mounted on fixed anchor pivots 18 carried by the backing plate and connected by the usual return spring 20.

Each of the shoes 14 and 16 has at its upper end a novel end fitting shown as a steel stamping folded to provide oppositely-projecting flanges 22 spot-welded to the side of the shoe web, and a central double-thickness thrust portion 24 projecting laterally from the shoe and slidably engaging the backing plate, together with a wedge-shaped double-thickness end portion 26 projecting crosswise of the end of the shoe in thrust engagement therewith.

Between the shoe ends is arranged a novel applying device, preferably including a double wedge 28 having pairs of flanges 30 embracing the above-described end wedges 26, and carried by or formed integrally on a plunger 32 slidably mounted for movement perpendicularly toward the backing plate. The wedge 30 may if desired have contacting portions of different inclination to move the shoes at different rates. In the embodiment illustrated the wedge portion contacting with the end of shoe 14 has a greater inclination than the wedge contacting with shoe 16 and moves shoe 14 a greater distance toward the drum for a given movement of the wedge than it moves shoe 16. Plunger 32 may be mounted in a tubular central portion 34 of a bracket having side wings 36 frictionally secured shiftably to the backing plate by bolts 38 passing through slots 40. A flexible steel cable 42, or an equivalent tension element perpendicular to the backing plate, passes through the tubular portion 34 and through the plunger 32 and is secured to the latter by means such as a nut 44.

Preferably the cable 42 or its equivalent passes through a Bowden-type conduit 46, of any desired construction, seated at its end in a novel fitting 48 threaded or otherwise mounted on the end of portion 34 of the bracket. A return spring 50 for wedge 28 is confined between fitting 48 and the base of plunger 32, surrounding cable 42.

In operation, tension on cable 42 operates wedge 28 against the resistance of return springs 20 and 50, to force the shoes apart to apply the brake, the component of force in the direction of the backing plate being taken by the slidable engagement of members 24 with the backing plate.

While one illustrative embodiment has been described in detail, it is not my intention to limit the scope of the invention to that particular embodiment, or otherwise than by the terms of the appended claims.

I claim:

1. A brake comprising, in combination, a backing plate carrying friction means having adjacent separable ends, a tension element passing through the backing plate substantially at right angles thereto, a sliding plunger connected to the tension element between said ends and movable perpendicularly to the backing plate, and a wedge secured to said plunger and acting on said ends.

2. A brake comprising, in combination, a backing plate carrying friction means having adjacent separable ends, a tension element passing through the backing plate substantially at right angles thereto, a sliding plunger connected to the tension element between said ends and movable perpendicularly to the backing plate, and a wedge secured to said plunger and acting on said ends, together with a bracket shiftably mounted on the backing plate and in which said plunger is slidably supported.

3. A brake comprising, in combination, a backing plate carrying friction means having adjacent separable ends, a tension element passing through the backing plate substantially at right angles thereto, a sliding plunger connected to the tension element between said ends and movable perpendicularly to the backing plate, and a wedge secured to said plunger and acting on said ends, together with a bracket in which said plunger is slidably supported and means frictionally securing the bracket shiftably to the backing plate.

4. A brake shoe having at its end a thrust device with a portion extending across the end of the shoe, and another portion secured to the side of the shoe, and a third portion extending laterally from the shoe to engage a support and prevent lateral movement of the shoe.

5. A brake shoe having at its end a thrust device with a portion extending across the end of the shoe, and another portion extending laterally from the shoe to engage a support and prevent lateral movement of the shoe.

6. A brake shoe having a steadying device comprising a stamping folded to provide flanges secured to the side of the shoe and continued as a double-thickness portion projecting laterally from the shoe.

7. A brake shoe having a steadying device comprising a stamping having a portion secured to the side of the shoe and continued as a portion projecting laterally from the shoe and also having a portion at the end of the shoe adapted to be engaged by an applying device.

8. A brake shoe having a steadying device projecting laterally from one side and extending crosswise of the end of the shoe as a thrust member engageable with an applying device.

9. A brake comprising, in combination, a backing plate; friction means having adjacent separable ends and provided adjacent said ends with steadying parts projecting laterally into slidable engagement with the backing plate, and an applying device movable between and in engagement with said ends toward the backing plate and whose component of force in its direction of movement is taken by the engagement of said parts with the backing plate.

10. A brake comprising, in combination, a backing plate; friction means having adjacent separable ends and provided adjacent said ends with steadying parts projecting laterally into slidable engagement with the backing plate, and a wedge movable between and in engagement with said ends toward the backing plate and whose component of force in its direction of movement is taken by the engagement of said parts with the backing plate.

11. A brake comprising, in combination, a backing plate, shoes having secured at their ends separately-formed stampings having portions projecting laterally into slidable engagement with said plate and having other portions extending across said ends, and an applying device movable perpendicularly toward the plate and engaging said other portions and forcing the shoes apart, the component of force in the direction of the plate being taken by engagement of the laterally-projecting portions with the plate.

12. A brake comprising, in combination, a backing plate, shoes having secured at their ends separately-formed stampings having portions projecting laterally into slidable engagement with said plate and having other portions extending across said ends, and a wedge movable perpendicularly toward the plate and wedgingly engaging said other portions, the component of force in the direction of the plate being taken by engagement of the laterally-projecting portions with the plate.

13. Brake-applying means comprising, in combination, an applying device including a plunger, a flexible tension element connected to said plunger, a bracket having a tubular portion slidably embracing the plunger, a Bowden-type conduit enclosing said element and having an end fitting secured to the tubular portion, and a return spring confined between said fitting and the base of the plunger.

LUDGER E. LA BRIE.